United States Patent Office 2,948,919
Patented Aug. 16, 1960

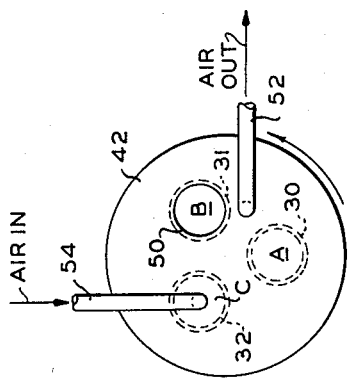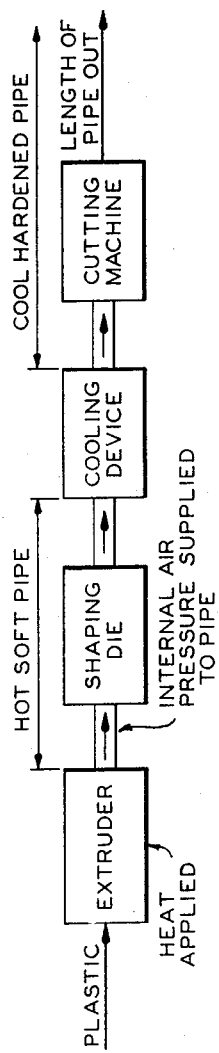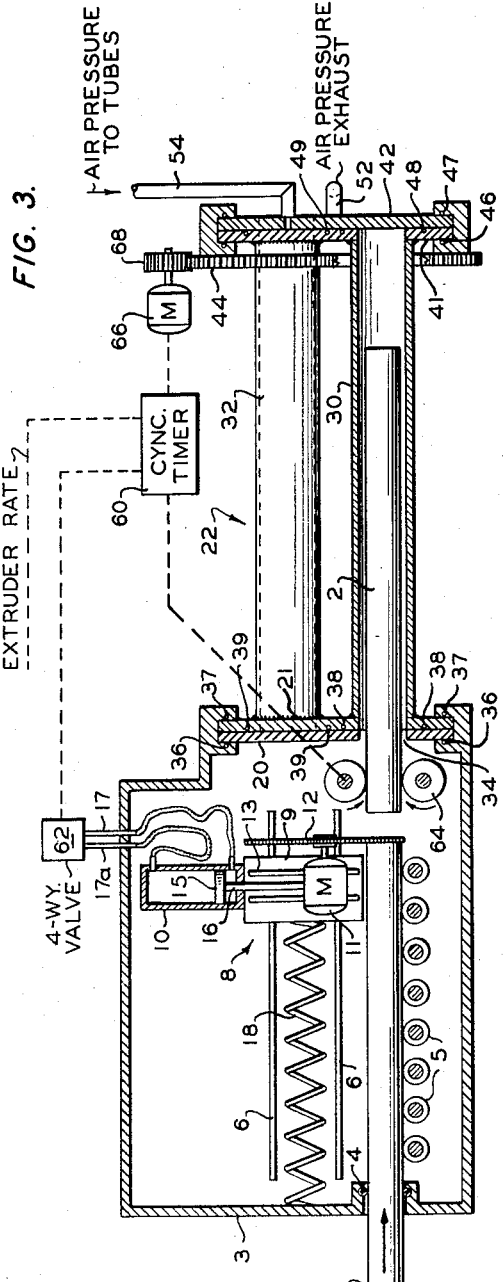

2,948,919

METHOD AND APPARATUS FOR PRODUCING EXTRUDED PIPE UNDER INTERNAL PRESSURE

Robert W. Matthews, Dewey, Okla., assignor to Phillips Petroleum Company, a corporation of Delaware Filed Oct. 28, 1957, Ser. No. 692,743

5 Claims. (Cl. 18—1)

This invention relates to method and apparatus for maintaining pressure in a pipe or tube which is subject to internal pressure during its production. In one aspect it relates to method and apparatus for cutting such pipe or tube into lengths while maintaining pressure therein.

Extrusion is a frequently used technique in producing pipe and tubing. It is generally used in the production of pipe and tubing made from thermoplastic materials such as "nylon," polyvinyl acetate, polyvinyl chloride, and polyolefins, especially polyethylene. Ordinarily, the pipe is extruded then passes through a shaping die, a cooling bath, and then is cut into lengths.

In production of pipe and tubing from thermoplastic materials the pipe is very soft immediately after extrusion and the walls thereof readily collapse during the subsequent shaping and cutting operations. One technique for preventing collapse has been to apply internal pressure to the soft pipe at the point of extrusion. Air pressure is commonly used. The pipe is then hardened by cooling and then cut into lengths.

Obviously, the entire length of the pipe, soft and hard, is subject to this pressure. When the hardened portion of the pipe is cut, pressure falls and the soft part of the pipe then collapses. The collapsed portion forms a waste nipple which must then be cut out and thrown away. To prevent such pressure loss and collapse, the end of the pipe has been plugged by various means. One way of plugging has been to hold a plug internally of the pipe by the use of a magnetic field; this plug is disposed between the pressure source and the cutoff tool. Defects in this solution are that the plug cannot fit too tightly because the pipe moves relative to it and therefore pressure is lost. Also, if the magnetic field fails, pressure differential will blow the plug out of the pipe. Another commonly used technique for trying to maintain pressure is to rapidly cut the pipe and to quickly plug the open end of the pipe. This is done manually, as a general rule, and results in a waste of pipe due to collapse of the soft portion, slows down production, increases labor costs and results in a safety hazard due to the strong possibility of the plug being blown from the end of the pipe.

Further, certain thermoplastics burn or char if they come in contact with the atmosphere while hot and soft, e.g., cellulose nitrate and cellulose acetate. This is an additional problem in handling these materials since they are still subject to collapsing at their soft portion during the production of pipe made therefrom.

The instant invention eliminates plugs by doing the cutting of pipe in a zone that is under the same pressure as that desired to be maintained in the pipe, thus eliminating the pressure difference that allows compressed air to flow out of the pipe. It offers a way to give a controlled atmosphere which is desirable for handling certain materials. The process and apparatus is especially suitable for the production of large pipe which, by virtue of its structure cannot be conveniently coiled and therefore must be cut into standard lengths.

It is an object of this invention to provide a method and apparatus for maintaining the pressure inside a pipe while cutting it. Another object of this invention is to maintain the pressure inside thermoplastic pipe while cutting it. Another object is to provide a method and apparatus for controlling the atmosphere surrounding a portion of a pipe during its manufacture, particularly during cutting. Other objects and advantages will become apparent from the following disclosure.

Figure 1 is a schematic diagram showing the sequence of operations in production of extruded plastic pipe.

Figure 2 is an elevation in cross section of the essential parts of the apparatus.

Figure 3 is an end view of the pipe removing means.

Figure 1 is believed to be self-explanatory in its showing of a typical sequence of the mechanical operations involved in extruding plastic pipe. While the pipe is still soft and hot from the extruder, it is passed through the shaping die where it is given its perfected configuration and external finish. The shaping die itself is ordinarily cooled, hence some cooling of the pipe occurs in the die. Subsequent cooling hardens the pipe, and the hardened portion is then cut.

Referring now to Figure 2, pipe 1 is shown being fed into the apparatus where a portion 2 is to be cut off. The cutting operation is carried out in a pressurizable cutting chamber 3 which has an inlet seal 4 for engaging the pipe 1 as it enters the chamber. A plurality of rollers 5 support pipe 1 as it proceeds through the chamber 3 to the point of cut-off.

Inside the chamber 3 are tracks 6 which support a cutting machine assembly 8 and allow the assembly to move in a path parallel to that of the pipe 1. The assembly 8 includes a bed 9 which engages tracks 6 and also supports a cylinder 10 and a motor 11. A saw blade 12 is mounted on the shaft of motor 11. The bed 9 includes a pair of guides 13 that engage the base of motor 11. A piston 15, mounted in cylinder 10, is connected to the motor 11 by a piston rod 16. Movement of the piston thus causes the motor to move laterally along the guides 13, and thereby moves the blade 12 into or out of cutting engagement with the pipe 1.

Cylinder 10 may be subjected to pneumatic or hydraulic pressure through lines 17a and 17. Electrical equivalents of cylinder 10 may be used.

A spring 18 urges the assembly 8 leftwardly, Figure 1, when a cut has been completed and the blade 12 disengaged from the pipe. A screw bed return mechanism could be used in lieu of spring 18.

At the outlet or right end of the chamber 3, as viewed in Figure 2, is a stationary plate 20 that seals the chamber. This plate is sealingly engaged by the rotating plate 21 of indexing assembly 22, the complete construction of the latter being described below. The rotating plate 21 has three ports formed therein by the left ends of tubes 30, 31 and 32 passing through it. The stationary plate 20 has one port 34 therein at a position corresponding to A, such as seen in Figure 3, to register with one of the tubes 30, 31 and 32 at the position A as the indexing assembly 22 turns, in a manner to be hereinafter described. The plate 20 is blind to the other two tubes when in registration with one of them.

The seal 36 prevents pressure leaks out of the chamber 3. Bearing 37 provides a means for taking up force longitudinal of the tubes. Seals 38 and 39 are mounted in plate 20 and prevent leakage from the chamber into the tubes at positions A and C (Figure 3) or from one tube to other tubes along the adjacent surfaces of the plates 20 and 21. A third seal, not shown, may be provided for the tube at position B. The seals may be mounted on either of the two plates 20, 21. Bearing 37 may be a sealed bearing in which case it is feasible to eliminate all seals except that for tube B which should be mounted in plate 20.

As mentioned above, the indexing assembly 22 includes the rotating plate 21 and tubes 30, 31 and 32. The right ends of the tubes (as viewed in Figure 2) pass through another rotating plate 41 to thereby form three ports in the latter. The plate 41 in turn engages a second stationary plate 42, in a manner similar to the engagement of plate 21 with plate 20. The gear 44 is secured to the indexing assembly. The entire assembly 22 is supported between plates 20 and 42 to permit unidirectional rotation thereby to successively bring the right and left ends of tubes 30, 31 and 32 into registration with the ports 34 and 50, respectively. The tubes 30, 31 and 32 are spaced 120° apart on equal radii from the center about which the assembly 21 rotates. A seal 46 is provided to prevent leakage out of one side of the end plates 41, 42. Seals 47, 48 and 49 serve the same purposes as their respective counterparts numbered 37 through 39 inclusive.

Referring now to Figure 3, the stationary plate 42 has a pipe removal port 50 therein, located 120° from the port 34 in the direction of rotation of assembly 22. Located in the last-mentioned 120° arc is an air exhaust line 52. Disposed an additional 120° from the port 50 is an air supply line 54.

A synchronous timer 60 is arranged as shown schematically in Figure 2, to operate in proper sequence the cutting machine assembly 8 and the indexing assembly 22. Means such as a time delay switch, not shown (designated as "extruder rate"), are provided to cause the timer 60 to begin the sequence of operations after a predetermined length of pipe, for example 20 feet, has been fed into chamber 3. The timer first operates fourway valve 62 which in turn directs pressurized fluid, preferably compressed air, through lines 17a and 17 in that order into the cylinder 10. In the preferred embodiment, the timer 60 is designed to then actuate in sequence removing rollers 64 and indexing motor 66, the latter driving a pinion 68 that engages the gear 44.

The mode of operation will now be described assuming compressed air to be the pressurizing fluid used in the chamber 3, four-way valve 62, and lines 52 and 54.

Referring to Figure 1 for a moment, it is evident that first, a length of the pipe 1 must be extruded that is equal to the distance between the extruder and the cutting machine. During the extrusion of this length at the time of starting up it may be necessary to plug the end of the pipe to prevent loss of pressure from within the pipe. The plug need not be removed from the pipe because severing of the first portion 2 therefrom will remove the plugged portion, and the cutting then proceeds without the use of plugs.

After pipe 1 has engaged the chamber seal 4, shown in Figure 2, pressure is built up in the chamber 3, preferably by admitting a sufficient quantity of compressed air through a manually operated valve (not shown). Pressure is thereafter maintained in the manner hereinafter described.

When the pipe 1 initially enters the chamber 3, the cutting machine assembly 8 is at the left end of the tracks 6, urged thereto by the spring 18 and the blade 12 is in a retracted position so that the pipe passes between it and rollers 5. The tube 30, at this instant is positioned at A as shown in Figure 3, in which position tube 30 registers with the port 34 (see Figure 2). The tubes 31 and 32 are at positions B and C, respectively, as shown in Figure 3, where compressed air enters the latter through line 54.

Again referring to Figure 2, after a predetermined length of pipe, say 20 feet, has passed the retracted blade 12, the timer 60 actuates four-way valve 62, thereupon admitting compressed air to cylinder 10 through line 16. This forces piston 15 to the position shown in Figure 2, and in so doing causes the blade 12 to sever portion 2 from the pipe 1. During the time necessary for severing the entire cutting machine assembly 8 is moved to the right along tracks 6 because the pipe 1 is pushing against the blade 12. During this same time part of the severed portion 2 enters tube 30. The entire machine and the pipe is now at the position shown in Figure 2.

Timer 60 now actuates the valve 62, admitting air through the line 17 and thereby causing blade 12 to retract from cutting engagement with the pipe. The cutting machine assembly 8 is now returned to the left end of tracks 6 by spring 18.

Simultaneously with causing retraction of the blade 12, the timer causes removing rollers 64 to increase their rotary speed and to engage the severed portion 2. This has the effect of flinging portion 2 into the tube 30 and assures that the left end of 2 clears the port 34. The speeding up of this removal also provides the period of time to allow the indexing operation, hereinafter described, to be carried out.

Referring now to Figure 3, the portion 2 is in the tube 30 at position A. The timer 60 now causes the motor 66 to operate, thereby rotating the indexing assembly 22 counterclockwise 120°. This operation moves tube 30 from A past exhaust 52 where the pressure in the tube is reduced to atmospheric to position B where the tube 30 registers with port 50. The severed portion 2 must now be removed through port 50. In the embodiment shown, removal is accomplished manually.

Simultaneously with the last-described motion of the tube 30 to position B, the tube 32 moves from position C to position A.

The entire sequence of operations is now repeated and the tube 30, now empty, is rotated to position C where compressed air flows thereinto from line 54. This builds up the pressure in the tube to the pressure in chamber 3 so that when it is next rotated to position A there will be no substantial change in the pressure of the chamber.

After the above-described sequence is again repeated, the tube 30 is rotated to position A where it registers with the port 34 and the apparatus assumes the position described above as when the pipe 1 initially enters the chamber 3.

Although air has been used in describing the pressurizing of the above apparatus it is apparent that a controlled atmosphere could be maintained therein and if desired, recovery of exhaust out of 52, compression thereof, and return of it through 54 can be accomplished. In any event, the pressure of the air or other gas is maintained equal in all of chamber 3, the tubes at positions A and C, and in the pipe 1 between the extruder and chamber 2. As is clear, this prevents flow out of the open end of the pipe 1, and therefore the collapse of the soft pipe at the extruder is prevented. It should also be evident that the pipe can be cut at angles other than 90° to its axis by providing suitable adjusting means in the cutting machine assembly 8. It is also evident that where the chamber 3 is of large volume as compared to the volume of the tubes 30, 31 and 32 that adequate air could be supplied from extruded pipe 1 alone, thus eliminating the supply line 54 and making possible a design using only two, instead of three, tubes.

It has been found that variations in the internal pipe pressure of approximately 10 percent are safe in that they will not cause the collapse of the pipe. Therefore, when I say "substantially constant pressure" or words to that effect, I mean pressure that varies within this safe limit.

It is not my intention nor my purpose to limit myself to the specific embodiment disclosed herein but to include as well, all those features and advantages apparent to one skilled in the art.

What I claim as my invention is:

1. In combination with means for extruding a hollow elongated article and for applying a positive internal pressure thereto, the apparatus comprising a chamber constructed to withstand an internal pressure and having an inlet and an outlet for the extruded pipe, a seal at said inlet for engaging the pipe thereby to prevent substantial loss of pressure from said chamber, rollers mounted in said chamber for supporting the pipe that has passed through said inlet, tracks mounted parallel to the axis of the pipe in said chamber, a bed mounted on said tracks for movement longitudinal of said pipe, a saw movably supported on said bed for movement transversely through the pipe, a stationary end plate sealingly mounted to the end of said chamber and providing an outlet port from said chamber, a first rotating plate sealingly engaging said stationary end plate, a second rotating plate, at least one tube mounted between said rotating plates, a first port in said first rotating plate and a second port in said second rotating plate respectively registering with the end of said tube adjacent thereto, all of said ports and said tube being of a size to receive the pipe, said first port disposed to register with said outlet port from said chamber at a point in the rotation of said first plate, said second rotating plate sealingly engaging a fixed plate, said fixed plate sealing said second port whenever said first port is at least partially registered with said outlet port and exposing said second port when said first and outlet ports are not in at least partial registry, means to maintain a pressure in said chamber, and means for intermittently rotating said rotating plates thereby to move said first port into and out of registry with said outlet port.

2. Apparatus comprising a pressurizable cutting chamber having a pipe inlet at one end, a seal at said inlet adapted to seal around a pipe as the pipe passes through said inlet, and an end plate with a pipe outlet therein at the opposite end; a power saw within said chamber; means within said chamber for supporting and guiding said saw parallel with the pipe; means for moving said saw transversely through the path of pipe moving from said inlet toward said outlet; means for urging said saw along the conveying means toward said inlet; an assembly comprising first and second rotatable end plates, a plurality of tubes spaced from a common axis and fixed between said first and said second rotatable end plates in sealing engagement therewith, said first rotatable end plate engaging said end plate on the outlet end of said chamber in sealed relation therewith, and means for rotatably supporting said assembly; a fixed plate positioned to sealably engage said second rotatable end plate, said fixed plate being blind to the tube that is aligned with said outlet, and having a removal port therein spaced along an arcuate path of rotation of said tubes from said outlet; means for rotating said assembly so that said tubes pass successively from alignment with said outlet to alignment with said removal port.

3. Apparatus comprising a pressurizable cutting chamber having a pipe inlet at one end and a pipe outlet at the opposite end; means fixed in said inlet for sealingly engaging a pipe as the pipe moves through said inlet with said means fixed therein; a cutter within said chamber; means within said chamber for supporting and guiding said cutter parallel with the pipe; means for moving said cutter reciprocably with respect to the last-said means and transversely through the path defined by the pipe in moving through said inlet toward said outlet; first and second rotatable end plates each having an opening therethrough, a tube sealingly engaged with said first and second plates and held in alignment at one end with the opening through said first plate and held in alignment at the other end with the opening through said second plate; means for rotatably supporting said first and second end plates and said tube to provide in a path of rotation therefor a position wherein said tube will be aligned with said pipe outlet; said first rotatable end plate being disposed adjacent said pipe outlet from said chamber; means for sealing for joint between said opposite end of said chamber and said first rotatable end plate; means for sealing the opening in said second rotatable end plate whenever said tube is aligned with said pipe outlet; and means for maintaining the pressure substantially constant in said chamber while said tube is rotating into and out of alignment with said pipe outlet.

4. A method of cutting off lengths of extruded plastic pipe while maintaining internal pressure inside the uncut pipe, the internal pressure having been applied to the pipe adjacent an extrusion machine thereby to prevent collapse of the pipe while in the hot, soft condition that follows immediately after extrusion, comprising providing a first pressurized zone in communication with a second pressurized zone; feeding the end of the pipe into the first pressurized zone while the pipe continues to be extruded outside of the first zone; cutting pipe in the first pressurized zone; feeding the cut lengths of pipe into the second pressurized zone; removing the second pressurized zone from communication with the first pressurize zone; removing the cut length of pipe from the second pressurized zone to a third zone; maintaining in the first and second zones a pressure substantially equal to the internal pipe pressure during said respective feeding cutting, feeding, and the first-said removing steps; and maintaining substantially constant pressure in the first zone during the second-said removing step; whereby pressure is maintained in the pipe upstream of the cutting operation and collapse of the pipe at the extruder while soft, is prevented.

5. A method of cutting off lengths of extruded plastic pipe while maintaining internal pressure inside the uncut pipe, the internal pressure having been applied to the pipe adjacent an extrusion machine thereby to prevent collapse of the pipe while in the hot, soft condition that follows immediately after extrusion, comprising providing a first pressurized zone in communication with one of a plurality of second pressurized zones, feeding the end of the pipe into the first pressurized zone while the pipe continues to be extruded outside of the first zone; cutting the pipe in the first pressurized zone; feeding the cut lengths of pipe into said one of said second pressurized zones; removing said one of said second pressurized zones from communication with the first pressurized zone and placing another of said second pressurized zones in communication with said first zone; removing the cut length of pipe from said one of said second pressurized zones to a third zone; and maintaining in the first and said one of said second zones a pressure substantially equal to the internal pipe pressure during said respective feeding, cutting, feeding, and the first said removing steps.

References Cited in the file of this patent
UNITED STATES PATENTS

| | | |
|---|---|---|
| 712,954 | Osborn | Nov. 4, 1902 |
| 1,370,800 | Egerton | Mar. 8, 1921 |
| 2,293,260 | Johnston | Aug. 18, 1942 |
| 2,325,431 | Shippy | July 27, 1943 |
| 2,377,494 | Greene | June 5, 1945 |
| 2,663,904 | Slaughter | Dec. 29, 1953 |

UNITED STATES PATENT OFFICE

CERTIFICATION OF CORRECTION

Patent No. 2,948,919                      August 16, 1960

Robert W. Matthews

It is hereby certified that error appears in the above numbered patent requiring correction and that the said Letters Patent should read as corrected below.

Column 6, line 7, for "for", second occurrence, read -- the --; line 27, for "pressuriz" read -- pressurized --.

Signed and sealed this 25th day of April 1961.

(SEAL)
Attest:

ERNEST W. SWIDER
Attesting Officer

DAVID L. LADD
Commissioner of Patents